UNITED STATES PATENT OFFICE.

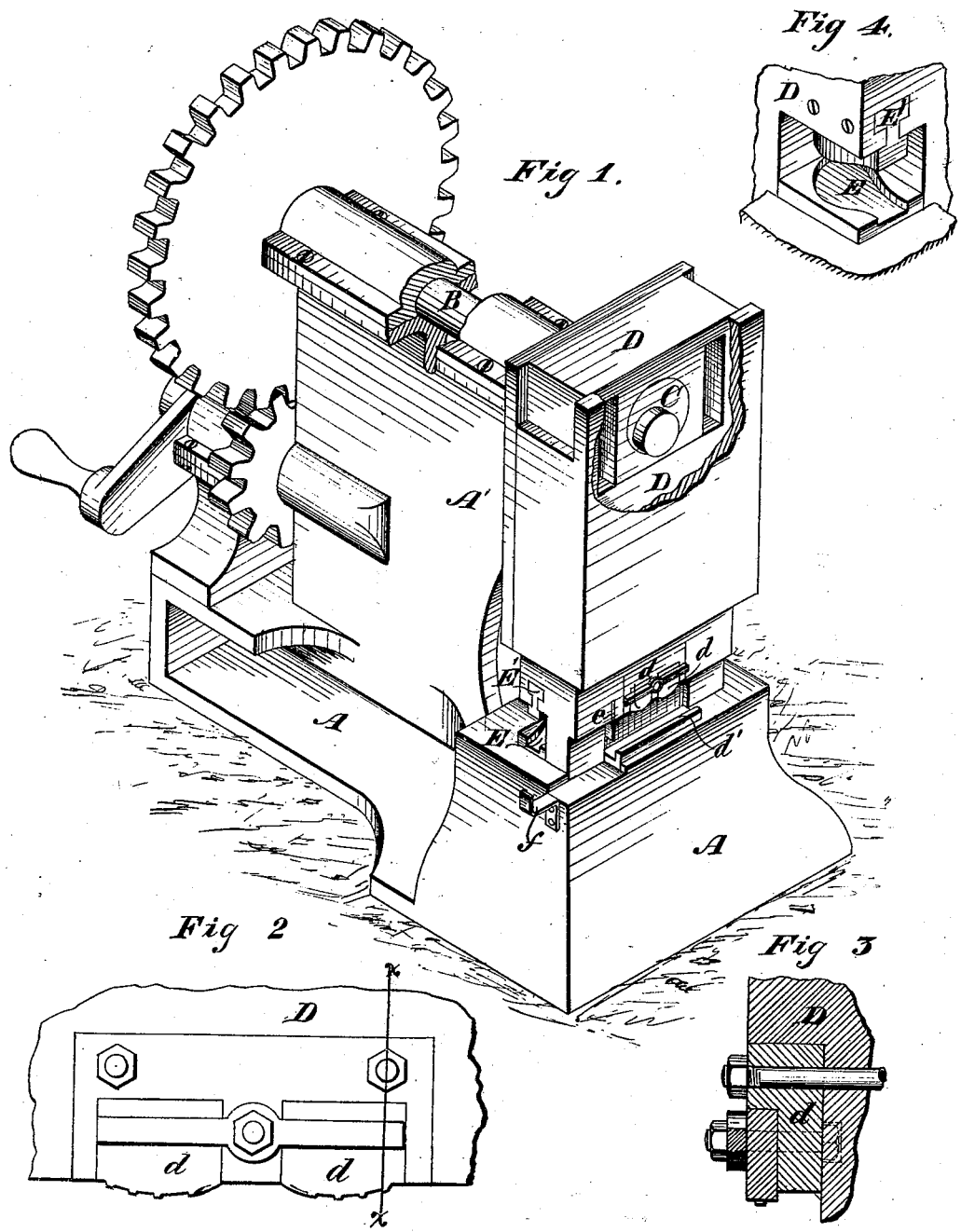

EDWARD R. ARCHER AND JAMES TURNER, OF RICHMOND, VIRGINIA, ASSIGNORS TO THE TREDEGAR COMPANY, OF SAME PLACE.

IMPROVEMENT IN MACHINES FOR MANUFACTURING HORSESHOES.

Specification forming part of Letters Patent No. 180,101, dated July 25, 1876; application filed December 11, 1875.

*To all whom it may concern:*

Be it known that we, EDWARD R. ARCHER and JAMES TURNER, both of the city of Richmond, in the county of Henrico and State of Virginia, have invented certain new and useful Improvements in Machinery for Manufacturing Horse and Mule Shoes, of which the following is a specification:

Our invention relates to a machine of that class in which reciprocating dies are employed; and our object is to provide cheap and efficient mechanism by which to form a complete blank and sever it from a bar at a single operation, and at the same time conform or shape to fit the hoof a previously formed and bent blank or shoe. To this end we construct a press and provide it with a plunger or reciprocating head carrying a cutter, and a punching, creasing, and pressing die, and with a stationary die, into which the bar from which the blank is to be formed is fed, whereby a blank is pressed, creased, punched, and severed from the bar at every descent of the plunger at a single operation. The press is also provided with a stationary die adapted to receive a previously formed blank bent into the shape of a shoe, and the plunger with a corresponding die, between which the shoes are flattened and conform to the bottom of a hoof, one at a time, at the same time that a blank is being formed by pressing, creasing, punching, and severing.

The subject-matter claimed will hereinafter specifically be designated.

In the drawings, Figure 1 is a perspective view of our machine, partly in section. Fig. 2 is a front view of the forming-dies. Fig. 3 is a section on the line *x x* of Fig. 2. Fig. 4 is a view of the flattening or conforming dies.

Upon a base, A, rests a frame or support, A', in suitable bearings in which a driving-shaft, B, driven by any suitable gearing turns. Upon this shaft is a cam, C, working in a cross-head or guide in a slot in the reciprocating plunger D, which carries a pressing, creasing, and punching die, $d$. Upon the base beneath this die is a stationary anvil or lower die, $d'$, into which the heated bar is to be slid to receive the impress of the die $d$. A cutter, $e$, which severs the finished blanks successively from the bar is carried by the plunger, and may serve as a guide or stop in forming the first blank. After that the formed blank on the end of the bar is pushed along with the bar until it strikes the stop $f$, which is set at the exact length of the blank from the cutter, and thus the bar is adjusted in position to receive the next impression from the dies. As each blank is severed by the cutter it may be seized by an attendant and conveyed to a bending-machine.

The conforming or flattening and finishing dies E E' are formed as shown. The bent blanks or shoes are flattened and conformed to the bottom of a hoof, one at a time, as they are brought from a suitable bending-machine to the dies E E'.

Both the blank forming dies and the conforming or flattening dies may be made of chilled cast-iron, and in sections, and may be readily removed when worn or broken, or when different-sized blanks are to be formed or conformed and replaced by others.

We claim as our invention—

1. The combination, substantially as hereinbefore set forth, of the stationary forming-die, the reciprocating plunger, the creasing and punching die, carried thereby, and the cutter, also carried by the plunger.

2. A machine for making horse and mule shoes, constructed, as hereinbefore described, with a base, provided with the stationary forming and conforming dies, and a reciprocating plunger, carrying the movable forming and conforming dies, whereby a blank is formed and a shoe is shaped to fit the hoof at each descent of the plunger.

In testimony whereof we have hereunto subscribed our names.

E. R. ARCHER.
JAMES TURNER.

Witnesses:
WM. R. TRIGG,
P. A. WELLFORD.